(12) United States Patent
Chen et al.

(10) Patent No.: US 7,017,814 B2
(45) Date of Patent: Mar. 28, 2006

(54) SYSTEM AND METHOD FOR PREVENTING PRINTING OF DUPLICATE BARCODES

(75) Inventors: Qing-Yuan Chen, Shenzhen (CN); Sheng Li, Shenzhen (CN)

(73) Assignee: Hon Hai Precision Industry Co., Ltd., (TW)

( * ) Notice: Subject to any disclaimer, the term of this patent is extended or adjusted under 35 U.S.C. 154(b) by 131 days.

(21) Appl. No.: 10/872,881

(22) Filed: Jun. 21, 2004

(65) Prior Publication Data

US 2005/0189420 A1   Sep. 1, 2005

(30) Foreign Application Priority Data

Feb. 27, 2004   (CN) .......................... 200410015529

(51) Int. Cl.
*G06K 7/10*   (2006.01)

(52) U.S. Cl. ............. 235/462.01; 235/375; 235/462.25

(58) Field of Classification Search ........... 235/462.01, 235/375, 436, 462.25
See application file for complete search history.

(56) References Cited

U.S. PATENT DOCUMENTS 5,479,588 A    12/1995  Sawada et al.
5,621,647 A *  4/1997   Kraemer et al. ............ 700/115
2003/0193530 A1  10/2003  Blackman et al.

\* cited by examiner

*Primary Examiner*—Michael G. Lee
*Assistant Examiner*—Kristy A. Haupt
(74) *Attorney, Agent, or Firm*—Morris Manning & Martin; Tim Tingkang Xia, Esq.

(57) ABSTRACT

A system for preventing printing of duplicate barcodes includes a server (1), a database (2), a number of user computers (3), and a printer (4). The server includes: a print parameter initializing module (22) for initializing print parameters; an initial barcode number determining module (23) for searching for a highest barcode number that has been previously printed according to a preset print date and a part number, and for adding one to the highest barcode number in order to create an initial barcode number for the first printed barcode; and a barcode print controlling module (24) for managing operations of printing barcodes in order to prevent the printer from printing duplicate barcodes. The barcode print controlling module comprises a print controlling sub-module (241), a print determining sub-module (242), a print quantity checking sub-module (243), and an impaired barcode printing sub-module (244). A related method is also disclosed.

9 Claims, 3 Drawing Sheets

SYSTEM AND METHOD FOR PREVENTING PRINTING OF DUPLICATE BARCODES

BACKGROUND OF THE INVENTION

1. Field of the Invention

The present invention relates generally to printing systems and methods, and especially to a system and method for ensuring accurate printing of barcodes.

2. Background of the Invention

A conventional barcode is a series of machine-readable parallel lines organized according to a pattern, the pattern representing, for example, a numeric or an alphanumeric sequence. Barcode patterns may also represent alpha or other coding schemes.

Barcodes are nowadays in general use throughout commerce; for example, in postal mail services, retail stock management, inventory storage, supply chain management, etc. The barcode includes useful information which is associated with different patterns of varying stripes, the information usually being coded in decimal digits or a combination of decimal digits and alphabetic characters. The quality of printed barcodes directly affects the efficient operation of numerous enterprises. Traditional means for printing barcodes are rather inefficient. The procedures involve a large number of manual tasks, such as inputting barcode data, printing, recording the printed barcode numbers, and determining whether or not there are duplicated barcodes. These manual steps are not only time consuming, but also often lead to human error. Thus, computer-based systems for printing barcodes are now rapidly gaining in popularity.

Automated systems for printing barcodes are disclosed in a number of patents. U.S. Pat. Publication No. 20030193530 published on Oct. 16, 2003 and entitled "Barcode Printing Module" discloses a system and method for producing barcodes. Barcodes can be produced by providing a medium and receiving a drive signal from a printing device. The medium receives, separately from the printing device, print imaging as a barcode pattern or barcode indicia corresponding to the drive signal. Barcode-bearing media are thereby produced externally of the printing device, but by making use of the printing device resources. The method realizes automatic management for printing barcodes, and improves efficiency.

Although the system and method provides the function of printing barcodes, it cannot effectively prevent a printer from printing duplicate barcodes, nor can it correct the printing of impaired barcodes. What is needed is a system and method for printing barcodes which can overcome the above-described shortcomings.

SUMMARY OF THE INVENTION

Accordingly, a main objective of the present invention is to provide a system and method which can record printed barcode numbers, prevent printing of duplicate barcodes, and timely reprint impaired barcodes.

To accomplish the above objective, a system for preventing printing of duplicate barcodes in accordance with a preferred embodiment of the present invention comprises a server, a database, a plurality of user computers and a printer. Each user computer provides an interactive user interface for users to maintain basic information, set print parameters, and perform printing operations. The server comprises: a basic data maintaining module for maintaining all kinds of basic print data by way of adding, modifying, searching and deleting the basic print data; a print parameter initializing module for setting print parameters; an initial barcode number determining module for searching for the highest barcode number that has been previously printed according to a print date and a part number on which the barcodes to be printed are attached, and for adding one to the highest barcode number in order to create an initial barcode number for the first printed barcode when the printer starts printing; and a barcode print controlling module for managing operations of printing barcodes in order to prevent the printer from printing duplicate barcodes. The barcode print controlling module comprises a print controlling sub-module, a print determining sub-module, a print quantity checking sub-module, and an impaired barcode printing sub-module. The database stores data used in or generated by the system. Such data comprises barcode data, customer data, data on part numbers on which barcodes are attached, etc.

Further, the present invention provides a method for preventing printing of duplicate barcodes, the method comprising the steps of: (a) maintaining basic data; (b) initializing print parameters according to user needs; (c) searching for a highest barcode number according to a preset print date and a part number on which the barcodes to be printed are attached, and adding one to the highest barcode number in order to create an initial barcode number for a first printed barcode; (d) printing the barcode, and storing the barcode number in a database; (e) adding one to the barcode number and to a current print quantity; (f) determining whether a user has canceled printing, and instructing the printer to stop printing subsequent barcodes and going directly to step (j) as described below if the user has canceled printing; (g) obtaining a print total from the database, and checking whether the current print quantity is equal to or greater than the print total if the user has not canceled printing; (h) returning to step (d) if the current print quantity is less than the print total; (i) receiving user-input instructions, and determining whether to reprint impaired barcodes if the current print quantity is equal to or greater than the print total; (j) displaying the printed barcode number and corresponding part number if the user does not need to reprint impaired barcodes; and (k) receiving an initial barcode number for impaired barcodes that need to be reprinted and a print total, instructing a printer to start reprinting the impaired barcodes continuously, and returning to step (d), if the user needs to reprint the impaired barcodes.

Other objects, advantages and novel features of the present invention will be drawn from the following detailed description with reference to the attached drawings, in which:

DETAILED DESCRIPTION OF THE INVENTION

Figure 1:
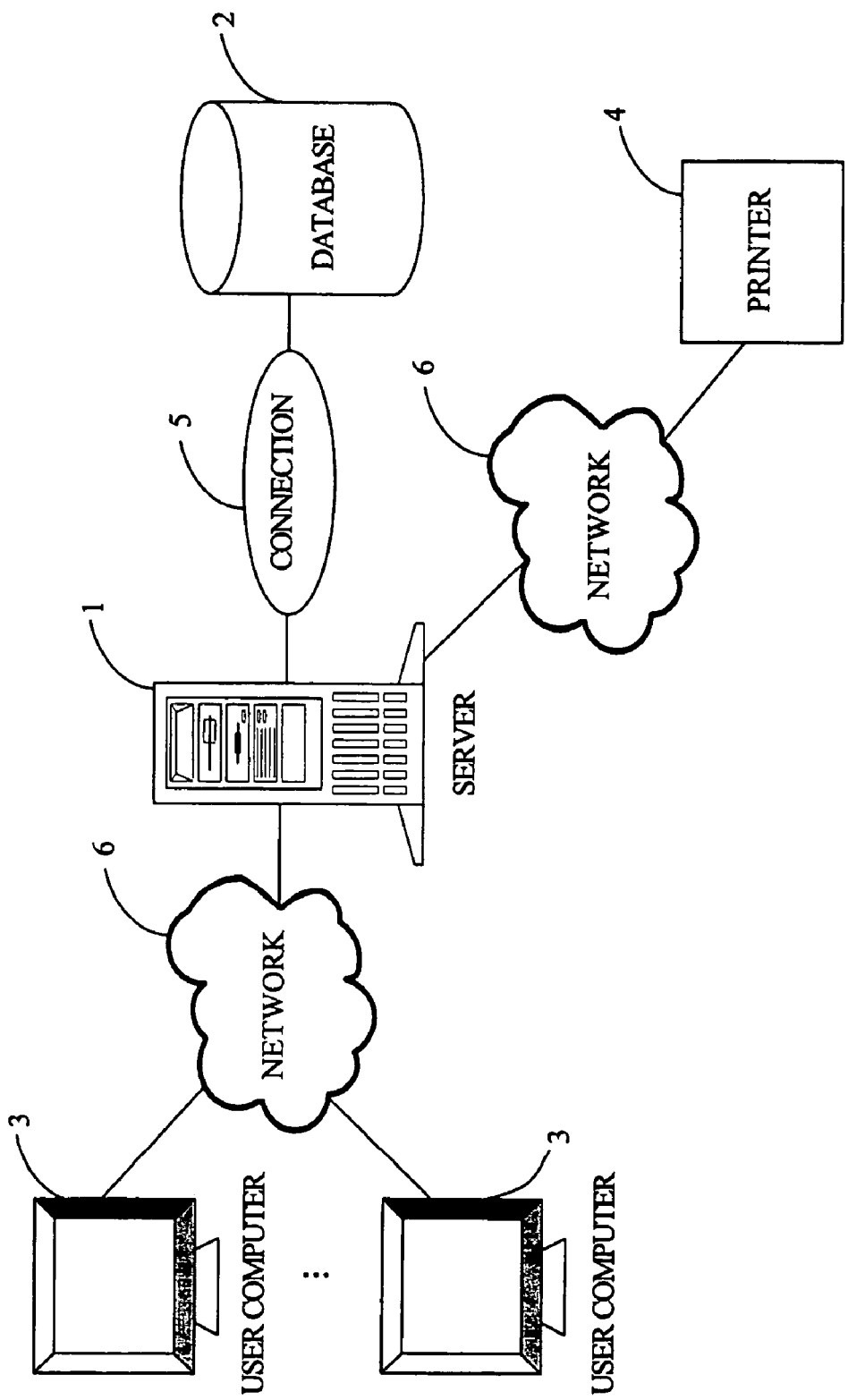
FIG. 1 is a schematic diagram of hardware infrastructure of a system for preventing printing of duplicate barcodes in accordance with the preferred embodiment of the present invention.

FIG. 1 is a schematic diagram of hardware infrastructure of a system for preventing printing of duplicate barcodes (hereinafter, "the system") in accordance with the preferred embodiment of the present invention. The system comprises a server 1, a database 2, a plurality of user computers 3, and a printer 4. The server 1 is connected with the database 2 via a connection 5, and is connected to the user computers 3 and the printer 4 through a network 6. The network 6 may be any suitable communication architecture required by the system, such as a local area network or a wide area network. The connection 5 is a kind of database connectivity such as an Open Database Connectivity (ODBC) or a Java Database Connectivity (JDBC). Each user computer 3 provides an interactive user interface for users to maintain basic data, set print parameters, and perform printing operations. The server 1 comprises a plurality of function modules (described in detail below in relation to FIG. 2) for initializing print parameters, determining an initial print barcode number, adding one to a barcode number and current print quantity after a barcode is printed, and determining whether to reprint impaired barcodes. The database 2 is provided for storing data or records used in or generated by the system. Such data comprise barcode data, customer data, data on part numbers on which barcodes are attached, etc. The printer 4 is for printing barcodes.

Figure 2:
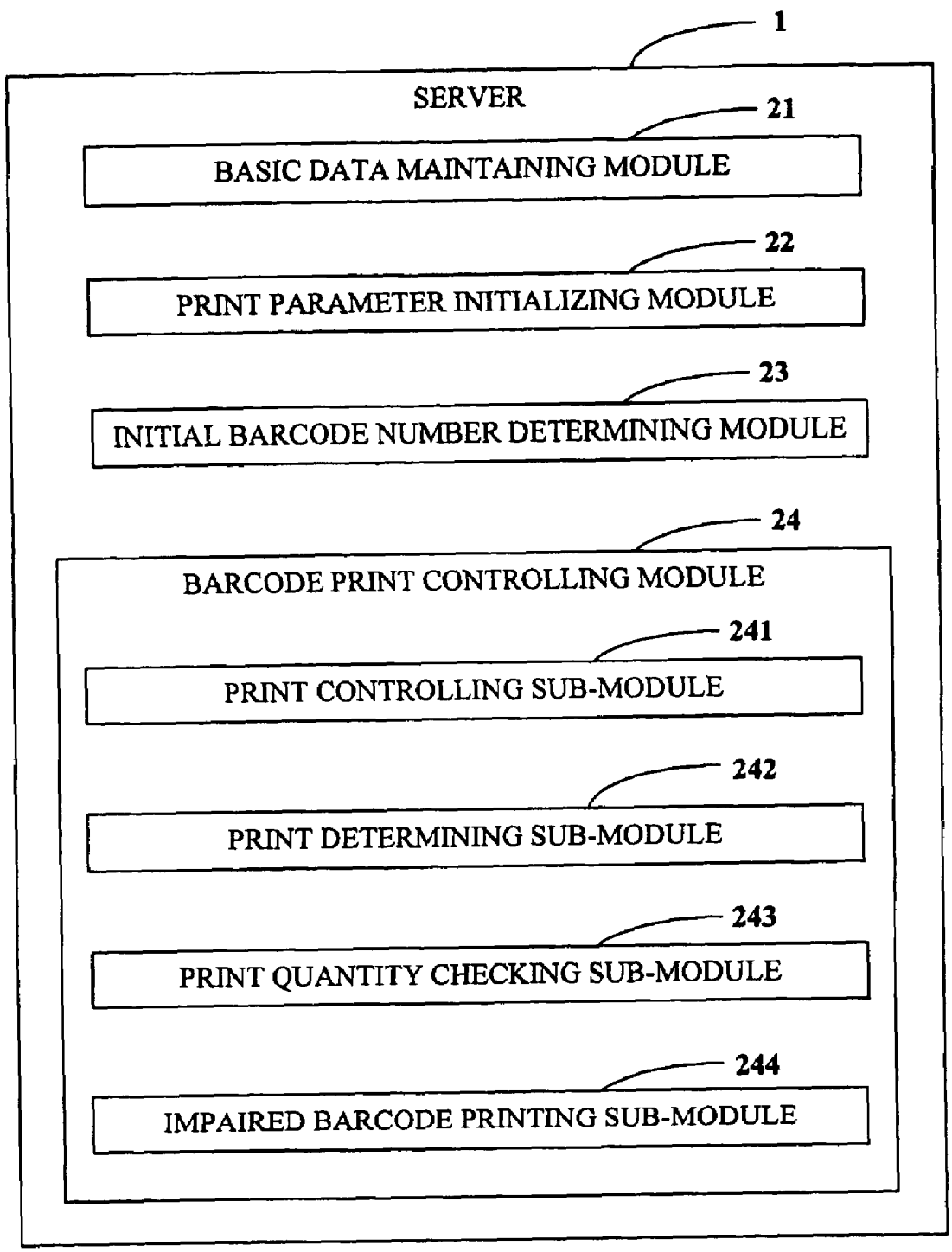
FIG. 2 is a schematic diagram of main function modules of a server of the system of FIG. 1.

FIG. 2 is a schematic diagram of main function modules of the server 1. The server 1 comprises a basic data maintaining module 21, a print parameter initializing module 22, an initial barcode number determining module 23, and a barcode print controlling module 24.

The basic data maintaining module 21 maintains all kinds of basic print data by way of adding, modifying, searching and deleting the basic print data. The basic print data typically include data on part numbers and data on barcodes. Data on each part number comprise a part number, a product type, a customer name, etc. Data on each barcode comprise a barcode format, a barcode number, a number system of the barcode, etc. The number system generally comprises a decimal number system and a hexadecimal number system. The basic print data are stored in the database 2.

The print parameter initializing module 22 is used for setting print parameters. The print parameters comprise a print speed, a print date, a part number on which barcodes are attached, a current print quantity, a print total, a barcode size, a barcode format, and a number system of the barcode. The parameters are stored in the database 2. The current print quantity is initialized as zero when the printer 4 begins printing barcodes each time.

The initial barcode number determining module 23 searches in the database 2 for the highest barcode number that has been previously printed according to a print date and a part number on which the barcodes to be printed are attached, and adds one to the highest barcode number in order to create an initial barcode number for the first printed barcode when the printer 4 starts printing.

The barcode print controlling module 24 manages operations of printing barcodes in order to prevent the printer 4 from printing a duplicate barcode, and comprises a print controlling sub-module 241, a print determining sub-module 242, a print quantity checking sub-module 243, and an impaired barcode printing sub-module 244. The print controlling sub-module 241 adds one to a current barcode number and a current print quantity after each barcode has been printed. The print determining sub-module 242 determines whether a user has canceled printing. If the user has canceled printing, the print determining sub-module 242 instructs the printer 4 to stop printing subsequent barcodes. The print quantity checking sub-module 243 is provided for checking whether the current print quantity is equal to or greater than a preset print total. If the current print quantity is less than the preset print total, the printer 4 proceeds to print a next barcode. Otherwise, the print quantity checking sub-module 243 instructs the printer 4 to stop printing subsequent barcodes. The impaired barcode printing sub-module 244 receives user-input instructions about whether to reprint impaired barcodes. If a user needs to reprint impaired barcodes, the impaired barcode printing sub-module 244 receives an initial barcode number for the impaired barcodes that needs to be reprinted and a print total that is input by the user through any user computer 3, and instructs the printer 4 to start reprinting the impaired barcodes continuously.

Figure 3:
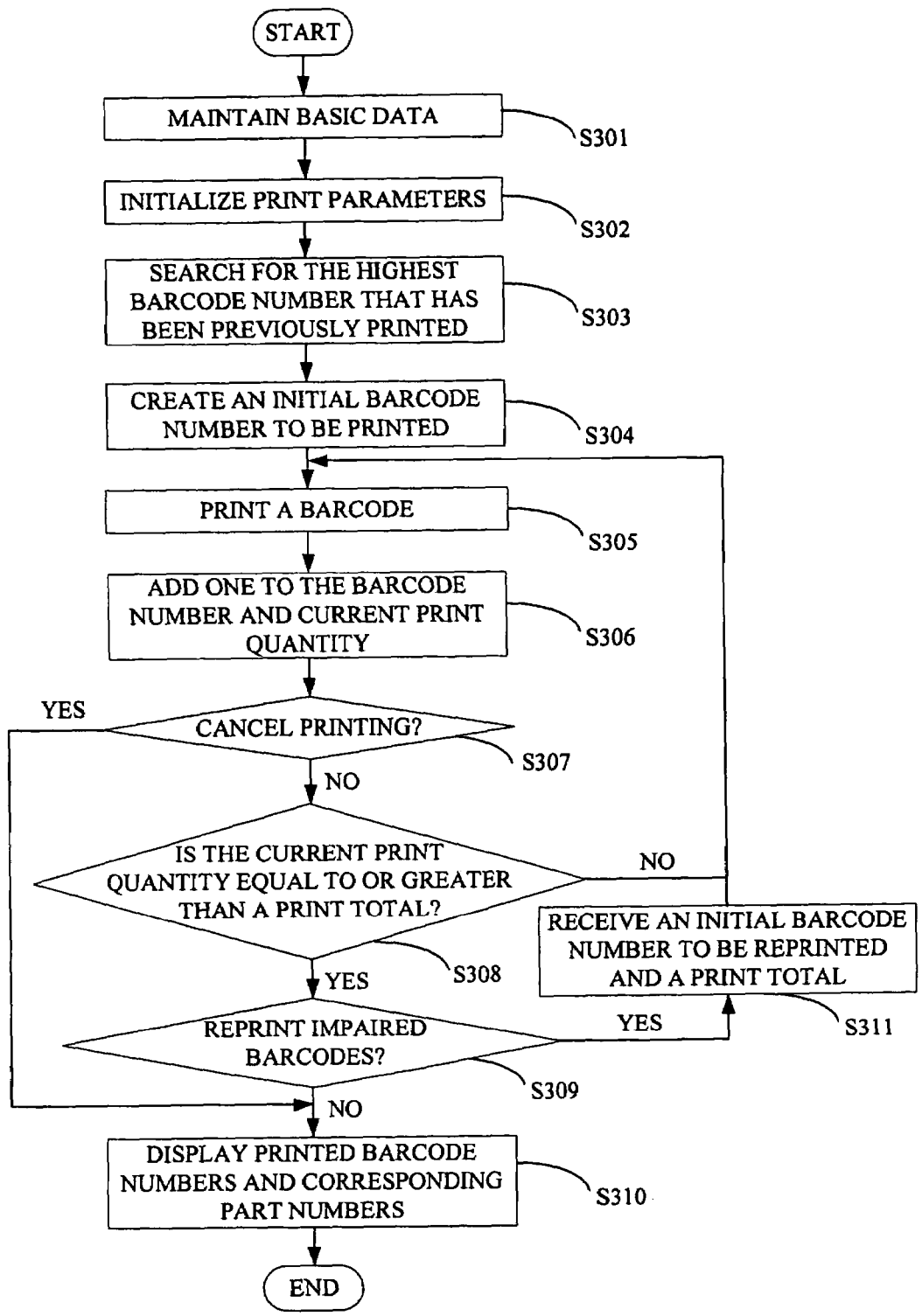
FIG. 3 is a flowchart of a preferred method for implementing the system of FIG. 1.

FIG. 3 is a flowchart of a preferred method for implementing the system. In step S301, the basic information maintaining module 21 maintains basic print data. In step S302, the print parameter initializing module 22 initializes print parameters according to user needs. The current print quantity is set as zero. In step S303, the initial barcode number determining module 23 searches in the database 2 for the highest barcode number that has been previously printed according to a preset print date and a part number on which the barcodes to be printed are attached. In step S304, the initial barcode number determining module 23 adds one to the highest barcode number in order to create an initial barcode number for the first printed barcode when the printer 4 starts printing. In step S305, the printer 4 prints the barcode. The barcode number is stored in the database 2. In step S306, the print controlling sub-module 241 adds one to the barcode number and the current print quantity. The new barcode number and current print quantity are stored in the database 3. In step S307, the print determining sub-module 242 determines whether the user has canceled printing. If the user has canceled printing, the print determining sub-module 242 instructs the printer 4 to stop printing subsequent barcodes, and the procedure goes directly to step S310 described below. If the user has not canceled printing, in step S308, the print quantity checking sub-module 243 checks whether the current print quantity is equal to or greater than a preset print total. If the current print quantity is less than the preset print total, the procedure returns to step S305. That is, the printer 4 proceeds to print a next barcode. If the current print quantity is equal to or greater than the preset print total, in step S309, the impaired barcode printing sub-module 244 receives user-input instructions and determines whether to reprint impaired barcodes. If the user needs to reprint the impaired barcodes, in step S311, the impaired barcode printing sub-module 244 receives an initial barcode number of the impaired barcodes that needs to be reprinted and a print total input by the user through any user computer 3, and instructs the printer 4 to start reprinting the impaired barcodes continuously. If the user does not need to reprint the impaired barcodes, in step S310, the user computer 3 displays the printed barcode numbers and corresponding part numbers, whereupon the procedure is ended.

Although the present invention has been specifically described on the basis of a preferred embodiment and a preferred method, the invention is not to be construed as being limited thereto. Various changes and modifications may be made to the embodiment and method without departing from the scope and spirit of the invention.

What is claimed is:

1. A system for preventing printing of duplicate barcodes, the system comprising a server, a database, one or more user computers and a printer, the server being interconnected with the database, said user computers and the printer through a means of communication, wherein the server comprises:
- a basic data maintaining module for maintaining all kinds of basic print data by way of adding, modifying, searching and deleting the basic print data;
- a print parameter initializing module for setting print parameters;
- an initial barcode number determining module for searching for a highest barcode number that has been previously printed according to a print date and a part number on which the barcodes to be printed are attached, and for adding one to the highest barcode number in order to create an initial barcode number for the first printed barcode when the printer starts printing; and
- a barcode print controlling module for managing operations of printing barcodes in order to prevent the printer from printing duplicate barcodes, the barcode print controlling module comprising:
  - a print controlling sub-module for adding one to a current barcode number and to a current print quantity after each barcode has been printed;
  - a print determining sub-module for determining whether a user has canceled printing;
  - a print quantity checking sub-module for checking whether the current print quantity is equal to or greater than a preset print total; and
  - an impaired barcode printing sub-module for receiving user-input instructions about whether to reprint one or more impaired barcodes, determining an initial barcode number for said impaired barcodes that need to be reprinted and a print total, and instructing the printer to start reprinting said impaired barcodes continuously.

2. The system as described in claim 1, wherein said user computers provide interactive user interfaces for users to maintain basic data, set print parameters, and perform printing operations.

3. The system as described in claim 1, wherein the basic print data comprise data on part numbers and data on barcodes.

4. The system as described in claim 1, wherein the print parameters comprise a print speed, a print date, a part number on which barcodes are attached, a current print quantity, a print total, a barcode size, a barcode format and a number system of the barcodes.

5. The system as described in claim 1, wherein the database stores barcode data, customer data, and data on part numbers on which barcodes are attached.

6. A method for preventing printing of duplicate barcodes, comprising the steps of:
- maintaining basic data;
- initializing print parameters according to user needs;
- searching for a highest barcode number that has been previously printed according to a preset print date and a part number on which the barcodes to be printed are attached, and adding one to the highest barcode number in order to create an initial barcode number for the first printed barcode;
- printing the barcode, and storing the barcode number in a database;
- adding one to the barcode number and to a current print quantity;
- determining whether a user has canceled printing;
- obtaining a print total from the database, and checking whether the current print quantity is equal to or greater than the print total if the user has not canceled printing;
- receiving user-input instructions, and determining whether to reprint one or more impaired barcodes if the current print quantity is equal to or greater than the print total; and
- receiving an initial barcode number for said impaired barcodes that need to be reprinted and a print total, and instructing a printer to start reprinting said impaired barcodes continuously if the user needs to reprint said impaired barcodes.

7. The method as described in claim 6, wherein the step of determining whether the user has canceled printing comprises the step of displaying the printed barcode numbers and corresponding part numbers, and instructing the printer to stop printing subsequent barcodes if the user has canceled printing.

8. The method as described in claim 6, wherein the step of checking whether the current print quantity is equal to or greater than the print total further comprises the step of proceeding to print a next barcode if the current print quantity is less than the print total.

9. The method as described in claim 6, wherein the step of determining whether to reprint one or more impaired barcodes further comprises the step of displaying the printed barcode numbers and corresponding part numbers if the user does not need to reprint said impaired barcodes.

* * * * *